J. H. STILLWAGGON.
HOSE RACK.
APPLICATION FILED FEB. 5, 1915.

1,150,075.

Patented Aug. 17, 1915.
2 SHEETS—SHEET 1.

Attest:
H. Veronica Fitzpatrick
Ada L. Barrett

John H. Stillwaggon
Inventor:
by Frank J. Kent
Atty.

J. H. STILLWAGGON.
HOSE RACK.
APPLICATION FILED FEB. 5, 1915.
1,150,075.
Patented Aug. 17, 1915.
2 SHEETS—SHEET 2.
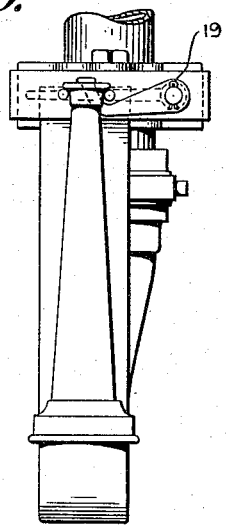
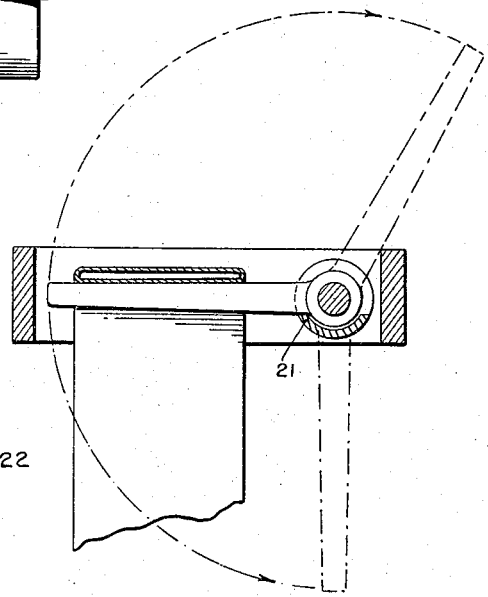
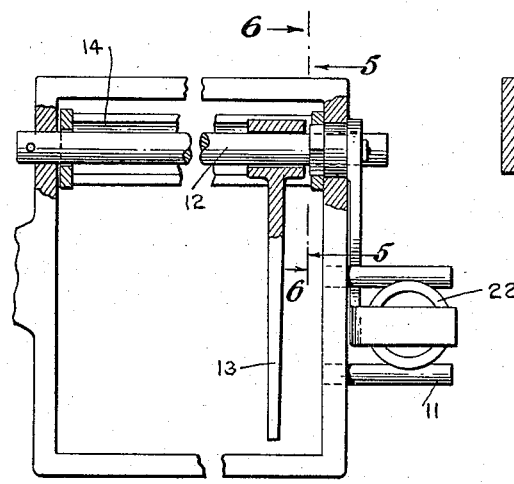
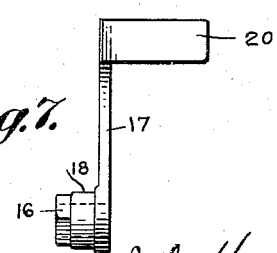
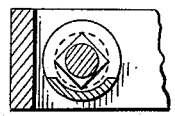
Attest:
N. Veronica Fitzpatrick.
Ada L. Barrett
John H. Stillwaggon
Inventor:
by
Frank J. Kent
Atty.

UNITED STATES PATENT OFFICE.

JOHN H. STILLWAGGON, OF RICHMOND HILL, NEW YORK.

HOSE-RACK.

1,150,075.   Specification of Letters Patent.   Patented Aug. 17, 1915.

Application filed February 5, 1915. Serial No. 6,240.

*To all whom it may concern:*

Be it known that I, JOHN H. STILLWAGGON, a citizen of the United States, residing at Richmond Hill, in the county of Queens and State of New York, have invented certain new and useful Improvements in Hose-Racks, of which the following is a specification.

This invention relates to hose supports for fire-hose and the like, adapted to support a hose and its nozzle in compacted and substantially coiled condition, and which, in cases of emergency, may be operated to precipitate the hose to the floor in automatically uncoiled condition, ready for use.

To this end the invention includes a tiltable rack normally supporting the hose, and a bearing member for the rack, between which bearing member and the rack the nozzle may be inserted in order to keep the rack in its normal position, the rack tilting under the weight of the hose when the nozzle is removed from such locking position.

One of the objects of the invention is to provide an improved form of rack, comprising a rod or equivalent member pivoted in a suitable frame or bearing, and having a plurality of hose-supporting arms loosely pivoted and capable of movement longitudinally of the rod, together with a stop member moving with the rod and limiting the rotation of the arms independently of the rod in one direction of movement.

Another object of the invention is to provide for the pivoted support of the device as a whole, and to accomplish a reversibility of certain of the parts so that the device may be pivotally supported, for instance, upon a standpipe adjacent a wall, and the rack will always rotate forwardly or away from the wall to discharge the hose, regardless of whether particular conditions demand that the device in its normal condition rest against the wall at one side or the other of the pipe.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

Figure 1:
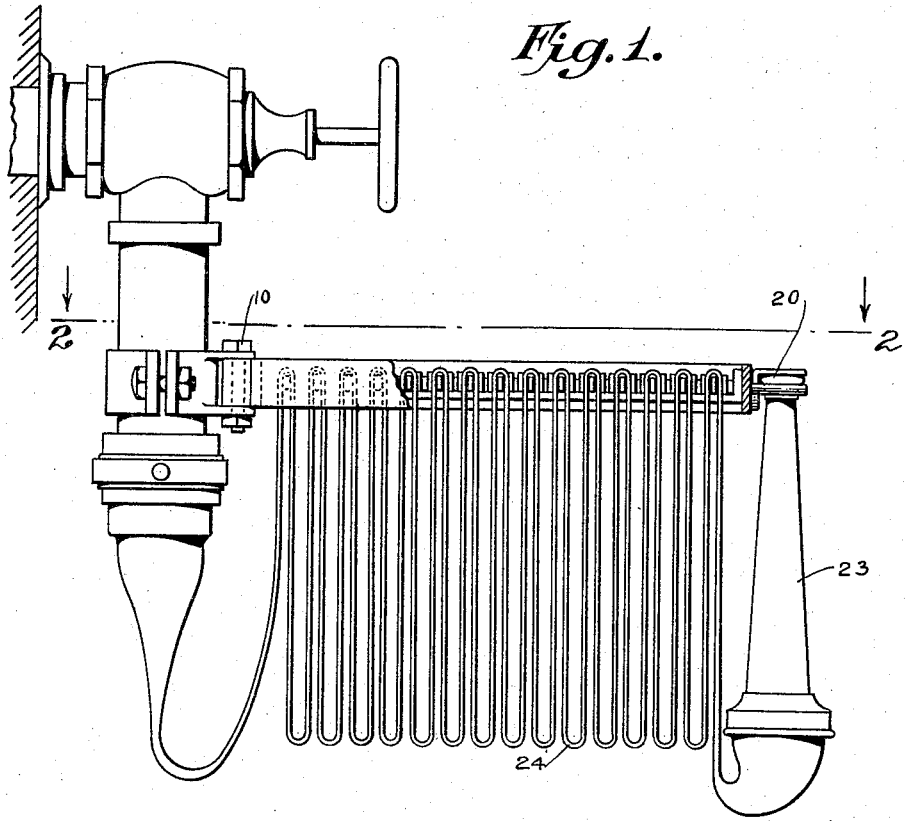
Figure 2:
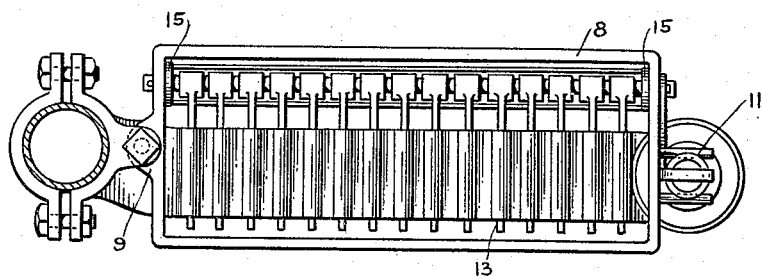

In the accompanying drawings, which are to be taken as a part of this specification, and in which I have shown a merely preferred form of embodiment of the invention, Figure 1 is an elevation of a device embodying my invention, with parts broken away; Fig. 2 is a view taken on the line 2—2 of Fig. 1 looking in the direction of the arrows; Fig. 3 is an end elevation of Fig. 1; Fig. 4 is a plan view, with parts in section and parts broken away, showing the rack frame, the rack-arms, the rod on which they are pivoted, the stop, and the rack-lock; Fig. 5 is an enlarged sectional view, taken on the line 5—5 of Fig. 4, showing the normal hose-supporting position of the rack-arms in full lines, and other positions in dot-and-dash lines; Fig. 6 is a detail sectional view, with parts in elevation, showing the relation between the rack parts and the locking-arm; and Fig. 7 is a detail of the locking-arm.

Referring to the numerals on the drawings, there is shown at 8 a frame, which may be generally rectangular. One end wall of this frame has an apertured boss 9, by means of which and a bolt 10 it may be connected to a pipe or other support, as shown in Fig. 1.

The opposite end wall of the frame is provided, in the present embodiment, with two pins 11, which are in a horizontal line midway of the height of the wall, (see Figs. 1 and 3). Extending through the two opposite end walls is a rod 12, and on this rod 12 there is a plurality of hose-supporting arms 13, loosely pivoted and slidable longitudinally of the rod. There is also a trough-like member 14, having lugs 15 at its ends through which the rod 12 passes, and the lug 15 at the righthand end of the trough-member (Figs. 2 and 4) has a squared aperture, which accommodates the correspondingly squared end 16 of a locking arm 17. Locking-arm 17 has also a bearing portion 18 which is received into the end wall of the frame 8 (Fig. 4), and the squared end 16 and bearing portion 18 are bored out to receive the rod 12, which extends through these portions of the locking arm and through the end wall of the frame, cotter pins 19 or the like, being provided at the ends of the rod 12. The outer end of locking arm has a transverse part 20, which is adapted to extend up between the pins 11 (Figs. 2 and 4). It will be evident that the edge 21 of the trough member 14, in the embodiment shown, will limit the independent rotative movement of the hose-supporting arms 13, so that if the trough member or stop 14 is held in the Fig. 5 position thereof, the hose-supporting arms 13 will be held in the full line position thereof (shown in that figure). But the arms 13 are free to move upwardly independently of the stop 14, and they may move downwardly if the stop is correspondingly rotated. The stop or trough member is held in its Fig. 5 position by bringing the end 20 of the locking arm 17 (which is keyed to the trough member) up between the two pins 11, and holding it there as by sliding the flanged end 22 of the hose nozzle 23 into position between the finger 20 and the pins 11. So long as the lock thus established is maintained the stop 14 will keep its Fig. 5 position, and the several hose-supporting arms 13 will remain in the full line position of Fig. 5. When, however, the end of the nozzle is pulled out from between finger 20 and pins 11, the weight of the loops of hose 24 on arms 13 is free to turn the trough member 14 and the arms 13 on their common axis, the rod 12, and the result is the precipitation of the hose to the floor, uncoiled.

The advantage of having the hose-supporting arms slidable on the rod 12 and rotatable in an upward direction is that by this arrangement the looping of the hose upon the arms 13 is facilitated, as will be obvious. Furthermore, since the rack is made up of identical arms 13, which are readily assembled with the other four parts of the device, that is, the frame 8, rod 12, stop 14, and locking arm 17, and since all of these parts may be very simple castings, it is evident that the device is cheap to manufacture.

The adaptability of the device for installation at either the right or left hand of its pivoted or other support, is due to the fact that by reversing the frame 8, and then replacing the rod, hose-supporting arms, and trough member, together with a locking arm 17 such as shown in Fig. 7, in place of the reversely arranged form shown in Fig. 4, the direction of rotation of the hose-supporting fingers in discharging the hose will be toward the opposite side of the frame 8, from what it is in Fig. 2.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language might be said to fall therebetween.

I claim:

1. In a device of the kind described, a frame, a rod secured in the frame, a trough-like member secured on the rod, and a plurality of hose-supporting arms pivoted on the rod and normally resting upon an edge of the trough-like member, and means for turning the trough-like member around the rod.

2. In a device of the kind described, a frame, a rod secured in the frame, a trough-like member secured on the rod, and a plurality of hose-supporting arms pivoted on the rod and normally resting upon an edge of the trough-like member, and means for turning the trough-like member around the rod, said means being detachably secured to the trough-like member and to the rod.

3. In a device of the kind described, a frame, a rod secured in the frame, a trough-like member secured on the rod, and a plurality of hose-supporting arms pivoted on the rod and normally resting upon an edge of the trough-like member, and means for turning the trough-like member around the rod, and means for holding said operating means in a given position.

4. In a device of the kind described, a frame, a rod detachably secured in the frame, a trough-like member pivoted on the rod, hose-supporting arms loosely pivoted on the rod and adapted to engage an edge of the trough, said trough having at one end a wall provided with a non-circular opening, and a locking member mounted in the frame and having a portion to fit said non-circular opening of the trough, and means on the frame engaging with said locking member.

5. In a device of the kind described, a frame, a rod secured in the frame, a plurality of hose supporting arms loosely pivoted on the rod, and a member adjacent the rod arranged to be moved around the same, said member constituting a stop for the pivoted arms when in one position and means for releasing said member.

6. In a device of the kind described, a frame, a rod secured in the frame, a plurality of hose supporting arms pivoted on the rod, and a member mounted coaxially with said rod and constituting a stop for limiting the movement of said arms when in one position and means for releasing said member.

7. In a device of the kind described, a frame, a rod, a plurality of hose supporting arms pivoted on the rod and a member adjacent the rod and arranged to be moved around the same, said member constituting a stop for the pivoted arms when in one position, an operating handle on said rod and means for releasing said handle.

8. In a device of the kind described, a frame, a rod, a plurality of hose supporting arms loosely pivoted on the rod and capable of movement longitudinally thereof, a stop member on the rod adapted to be moved around said rod, a handle for moving said stop member, pins on the frame and means supported by said pins for securing the handle in its raised position.

9. In a device of the kind described, a supporting frame, a rod, and a plurality of hose supporting arms loosely pivoted on the rod, a stop member arranged beneath the rod adapted for movement around the rod and means for causing such movement.

In testimony whereof I affix my signature in presence of two witnesses.

JOHN H. STILLWAGGON.

Witnesses:
MARY H. LEWIS,
HELEN V. FITZPATRICK.

Copies of this patent may be obtained for five cents each, by addressing the "Commissioner of Patents, Washington, D. C."